No. 731,105. Patented June 16, 1903.

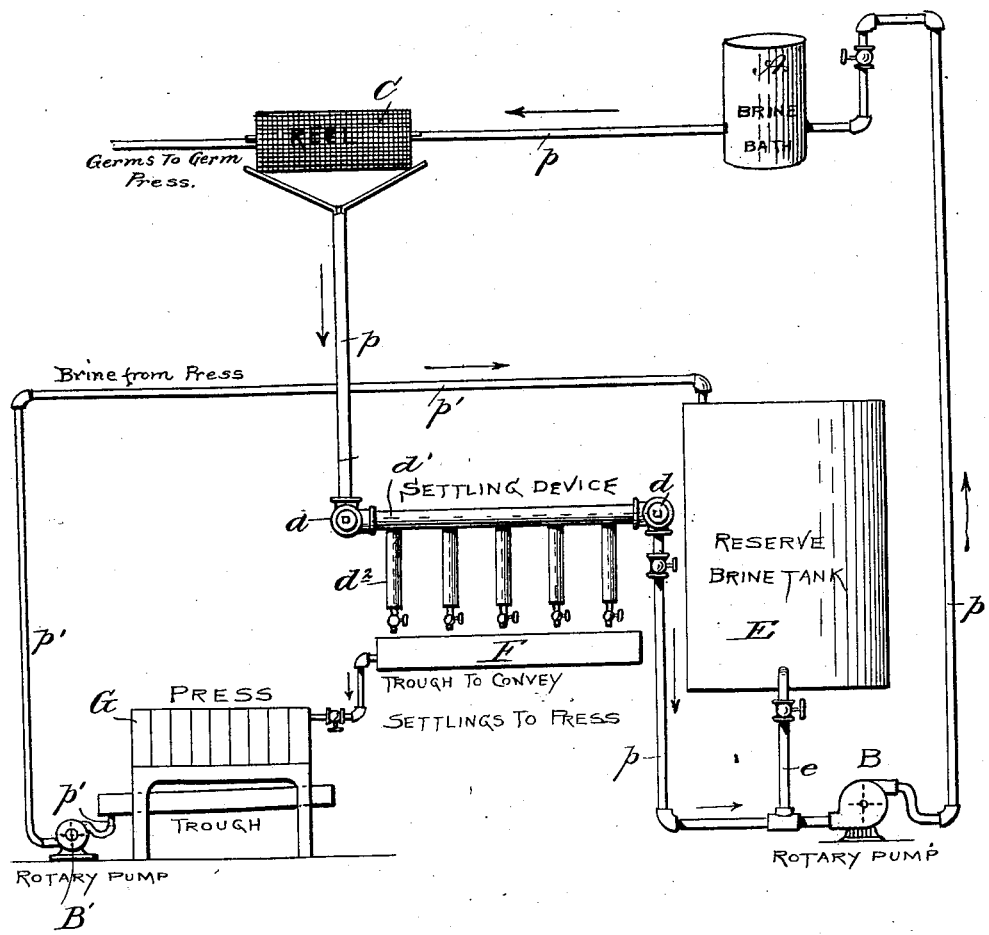

UNITED STATES PATENT OFFICE.

THOMAS T. GAFF, OF BARNSTABLE, MASSACHUSETTS, AND JOSEPH F. GENT, OF MOUNT CLEMENS, MICHIGAN; SAID GENT ASSIGNOR OF ONE-SIXTH OF HIS RIGHT TO SAID GAFF.

PROCESS OF PURIFYING BRINE.

SPECIFICATION forming part of Letters Patent No. 731,105, dated June 16, 1903.

Application filed September 26, 1902. Serial No. 124,987. (No specimens.)

*To all whom it may concern:*

Be it known that we, THOMAS T. GAFF, of Barnstable, in the county of Barnstable and State of Massachusetts, and JOSEPH F. GENT, of Mount Clemens, in the county of Macomb and State of Michigan, have invented a new and useful process of purifying brine used in the treatment of Indian corn for the purpose of effecting the separation of the starchy matter from the germs, of which the following is a specification.

In Letters Patent No. 687,219, dated November 26, 1901, granted to Thomas T. Gaff, one of the applicants herein, is described and claimed an improvement in the treatment of Indian corn, which involves, among other things, the employment of a brine-bath, through which the previously crushed or broken corn is passed for the purpose of separating the germ portions from the starchy portions. The latter being heavier sink in the bath. The germs being lighter float and are carried off with the brine at the overflow, there being a continuous current of brine into, through, and from the bath. In Letters Patent No. 687,220, dated November 26, 1901, granted to us jointly, we have described and claimed a form of bath which is well adapted to effect the separation of the germs from the heavier starchy matters and to lift and carry off from the bath the latter. In the practice of the said patented process we have found that the brine in course of time becomes charged with fine starchy and glutinous matters, which are not removed from the brine with the heavier starchy particles, but remain therein and are minute and light enough to be carried over from the bath with the brine and to be returned to the bath with the latter through the system of piping, by means of which, in connection with a suitable pump or equivalent instrumentality, the continuous circulation of the brine is maintained. To such an extent does this take place, indeed, that the brine finally becomes unfitted or unsuited for the work of separation.

Our invention is designed to obviate this objection and to maintain the brine substantially pure and in condition to effectively act; and to this end our invention consists in subjecting the continuously-circulating brine, after it leaves and before it returns to the bath, to the continuous action of separating agencies, whereby the starchy and glutinous material is separated out and removed from the brine.

In the accompanying drawing, to which reference will now be made for a better understanding of our invention, the figure represents, to a large extent diagrammatically, an apparatus in connection with which we practice our invention.

A is the brine-bath, which may be such as represented in the Letters Patent hereinbefore referred to, and from it lead pipes $p$, through which and the bath a continuous circulation of brine is maintained by means of the rotary power-driven pump B.

C is a reel (typical of any suitable or convenient straining device) through which passes the current of brine from the bath, carrying with it the germs, which are separated from the brine, the latter flowing therefrom down into a settling device D, consisting of headers $d$, connected by any suitable number of cross-pipes $d'$, provided each with a number of long pendent tubular pockets $d^2$, each having at its lower end a discharge-opening controlled by a valve or cock $d^3$. The starchy and glutinous material in the brine settles in great part in these pockets, while the brine, now purified sufficiently for the purposes of its use, flows on to the pump B and by the latter is returned to the brine-bath.

A reserve brine-tank E is employed, having a valve-controlled connection $e$ with the circulation-pipe system $p$, so that it may replace from time to time the unavoidable loss of brine.

The pockets $d^2$ are opened from time to time and are thus emptied of their thick liquid contents, consisting mainly of starchy matter. This starchy matter we recover, and we also save the brine with which it is mingled. To this end the liquid contents of the pockets $d^2$ are discharged into and caught by a trough F, from which they are led to a suitable separator, typified by the press G, wherein the solids are taken out, the expressed brine being returned by an auxiliary pump B', through piping $p'$, to the reserve brine-tank E. Any suitable separating agency may be employed in lieu of the settling device and the press, and in the case of the latter devices either of them may be used alone to the exclusion of the other. Were presses used alone, it would require a great number of them to pass the current of brine with sufficient expedition, with consequent increase of expense attendant upon installing and operating the same, an expense which is saved by the introduction of the settling device. On the other hand, were the settling device used alone the brine would be kept clear of the starchy matter to a sufficient degree; but the recovery of the solids thus separated out from it would be difficult if not practically impossible. For these reasons we prefer to use these two agencies in conjunction. They can of course be introduced into any part of the circulating circuit after removal of the germs and before the reëntry of the brine into the bath. We prefer also to pass the germs, after they have been separated out from the brine, through presses. The germs as they leave the reel are saturated with brine. By passing them through continuously-operating presses this brine is expressed and the germs are brought to a condition of comparative dryness. The brine thus expressed from the germs carries with it more or less starchy and glutinous material, which may be separated out from the brine and recovered in the same way and by the same means as the like material in the brine of the bath.

We do not claim herein the apparatus in connection with which we practice our invention. The same is made the subject of an application for Letters Patent in our joint names of even date herewith, Serial No. 124,988. We remark also that the particular form of settling device herein illustrated is the invention of Joseph F. Gent, one of the applicants herein, and has been by him made the subject of an application for Letters Patent of even date herewith.

Having described our invention and the best way now known to us of carrying the same into practical effect, what we claim herein as new, and desire to secure by Letters Patent, is as follows:

In the treatment of Indian corn for obtaining therefrom corn milling products, involving as one of its steps the employment of a brine-bath for the purpose of effecting the separation of the starchy particles from the germs, the process herein described of purifying the brine, consisting in maintaining a constant circulation of the brine through from and back into the bath, segregating from the brine the germs carried over with it from the bath, and then separating out from this germ-free brine, as it travels onward back again to the bath, the starchy and glutinous matter contained in it, substantially as and for the purposes hereinbefore set forth.

In testimony whereof we have hereunto set our hands the 17th day and 22d day, respectively, of September, 1902.

THOMAS T. GAFF.
JOSEPH F. GENT.

Witnesses to signature of Thomas T. Gaff:
   Z. E. GAFF,
   CHARLES F. PARKER.

Witnesses to signature of Joseph F. Gent:
   WINRUT H. D. FOX,
   ALFRED J. PARKER.